(12) United States Patent
Inagaki

(10) Patent No.: US 11,327,769 B2
(45) Date of Patent: May 10, 2022

(54) CONTROL DEVICE, IMAGE FORMING APPARATUS, AND START-UP METHOD THEREOF

(71) Applicant: TOSHIBA TEC KABUSHIKI KAISHA, Tokyo (JP)

(72) Inventor: Yasuhiro Inagaki, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 264 days.

(21) Appl. No.: 16/507,387

(22) Filed: Jul. 10, 2019

(65) Prior Publication Data
US 2020/0225961 A1  Jul. 16, 2020

(30) Foreign Application Priority Data
Jan. 16, 2019 (JP) .............................. JP2019-005048

(51) Int. Cl.
*G06F 9/4401* (2018.01)
*H04N 1/00* (2006.01)

(52) U.S. Cl.
CPC ....... *G06F 9/4401* (2013.01); *H04N 1/00891* (2013.01); *H04N 1/00962* (2013.01); *H04N 2201/0094* (2013.01)

(58) Field of Classification Search
None
See application file for complete search history.

(56) References Cited

U.S. PATENT DOCUMENTS

| 2006/0158681 A1* | 7/2006 | Yorimoto | H04N 1/00278 358/1.15 |
| 2014/0359260 A1* | 12/2014 | Utsumi | G06F 9/4418 713/1 |
| 2018/0241945 A1* | 8/2018 | Mimura | G06F 9/4418 |

FOREIGN PATENT DOCUMENTS

JP  2014-232366 A  12/2014

* cited by examiner

*Primary Examiner* — Frantz Bataille
(74) *Attorney, Agent, or Firm* — Foley & Lardner LLP

(57) ABSTRACT

A control device includes a main storage device, an auxiliary storage device, and a control unit. The auxiliary storage device is configured to store a first hibernation image and a second hibernation image, which respectively indicate a stored content of the main storage device. The control unit is configured to start a computer by loading the first hibernation image to the main storage device and subsequently loading the second hibernation image to the main storage device when the computer is turned on. The first hibernation image does not include connection information indicating a connection state of the device. The second hibernation image includes the connection information indicating the connection state.

20 Claims, 3 Drawing Sheets

CONTROL DEVICE, IMAGE FORMING APPARATUS, AND START-UP METHOD THEREOF

CROSS-REFERENCE TO RELATED APPLICATIONS

This application is based upon and claims the benefit of priority from Japanese Patent Application No. 2019-005048, filed Jan. 16, 2019, the entire contents of which are incorporated herein by reference.

FIELD

Embodiments described herein relate generally to a control device, an image forming apparatus, and a start-up method thereof.

BACKGROUND

In an apparatus such as an image forming apparatus, it is effective to power off the apparatus in order to reduce power consumption. Often times, when an apparatus in a power-off state is turned on, the apparatus is not ready to be used immediately. The apparatus requires a start-up time to boot up and to enter an operational state.

To reduce the start-up time, a method called hibernation can be used. Hibernation is a method of storing the contents of a main memory in a state where an apparatus is in operation as a hibernation image and loading the hibernation image to the main memory during the start-up of the apparatus. However, a start-up of an apparatus loading the hibernation image would fail or cannot perform when the apparatus is connected to different devices or systems compared to the connections ("connection state") that have been saved in the hibernation image.

DETAILED DESCRIPTION

Embodiments provide a control device, an image forming apparatus, and a start-up method thereof, which can reduce the start-up time.

In general, according to one embodiment, a control device includes a main storage device, an auxiliary storage device, and a control unit. The auxiliary storage device is configured to store a first hibernation image and a second hibernation image that indicate stored content of the main storage device. The control unit is configured to start a computer by loading the first hibernation image to the main storage device and subsequently loading the second hibernation image to the main storage device when the computer is turned on. The first hibernation image does not include connection information indicating the device connection state. The second hibernation image includes the connection information.

Hereinafter, an image forming apparatus according to an embodiment will be described with reference to the drawings. Each of the drawings for describing the following embodiment may illustrate the configuration with omission for description.

Figure 1:
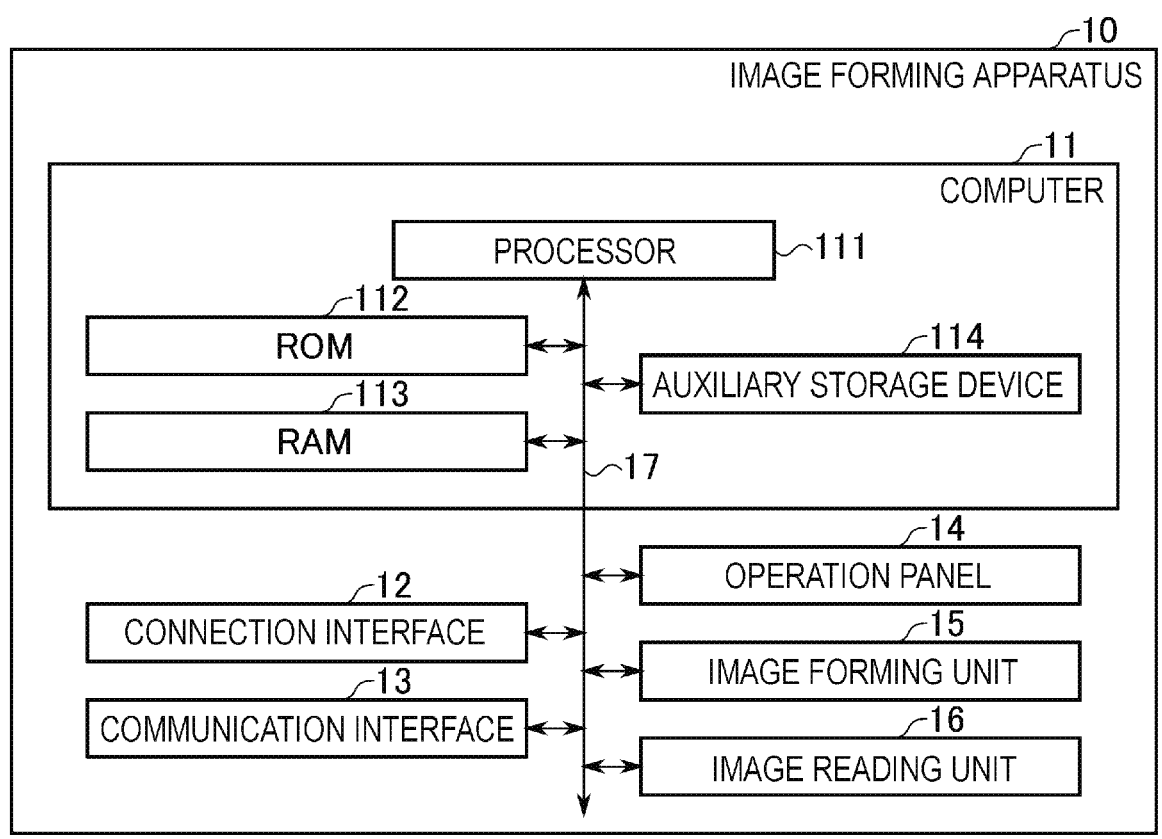
FIG. 1 is a block diagram illustrating an example of a main circuit configuration of an image forming apparatus according to an embodiment.

FIG. 1 is a block diagram illustrating an example of a main circuit configuration of an image forming apparatus 10 according to the embodiment.

The image forming apparatus 10 is, for example, an MFP (multifunction peripheral), a copying machine, a printer, or a facsimile machine. For example, the image forming apparatus 10 includes a printing function, a scanning function, a copying function, a decoloring function, and a facsimile function. The printing function is a function of forming an image on an image forming medium P or the like using a recording material such as toner. The image forming medium P is, for example, sheet-like paper. The scanning function is a function of reading an image from an original document or the like on which an image is formed. The copying function is a function of printing an image, which is read from an original document or the like using the scanning function, on the image forming medium P using the printing function. The decoloring function is a function of erasing an image formed on the image forming medium P using a decolorable recording material. The image forming apparatus 10 includes, for example, a computer 11, a connection interface 12, a communication interface 13, an operation panel 14, an image forming unit 15, and an image reading unit 16. The respective units are connected to each other through a bus 17 or the like.

The computer 11 executes a process such as a calculation or control required for the operation of the image forming apparatus 10. The computer 11 includes, for example, a processor 111, a ROM (read-only memory) 112, a RAM (random-access memory) 113, and an auxiliary storage device 114. The respective units are connected to each other through the bus 17 or the like. The computer 11 is an example of the control device.

The processor 111 corresponds to a central part of the computer 11. The processor 111 controls each of the units that execute various functions of the image forming apparatus 10 in accordance with programs such as system software, application software, or firmware stored in the ROM 112, the auxiliary storage device 114, or the like. Some or all of the programs may be incorporated into a circuit of the processor 111. The processor 111 is, for example, a CPU (central processing unit), an MPU (micro processing unit), a SoC (system on a chip), a DSP (digital signal processor), a GPU (graphics processing unit), an ASIC (application specific integrated circuit), a PLD (programmable logic device), or a FPGA (field-programmable gate array). Alternatively, the processor 111 may be configured with a combination of the above-described examples. The processor 111 is an example of the control unit.

The ROM 112 corresponds to the main storage device of the computer 11. The ROM 112 is a non-volatile memory used solely for reading data. The ROM 112 stores the firmware such as a BIOS (Basic Input/Output System) or a UEFI (Unified Extensible Firmware Interface) among the programs. In addition, the ROM 112 stores data or various set values that are used for the processor 111 to execute various processes.

The RAM 113 corresponds to the main storage device of the computer 11. The RAM 113 is a memory used for reading and writing data. The RAM 113 is used as, for example, a so-called work area that temporarily stores data used for the processor 111 to execute various processes. The RAM 113 is, for example, a volatile memory.

The auxiliary storage device 114 corresponds to the auxiliary storage device of the computer 11. The auxiliary storage device 114 is, for example, an EEPROM (electric erasable programmable read-only memory), an HDD (hard disk drive), an SSD (solid state drive), or an eMMC (embedded MultiMediaCard). The auxiliary storage device 114 stores, for example, the system software and the application software among the programs. The system software includes an OS (operating system) or the like. In the following description, the auxiliary storage device 114 is assumed to store only one OS. However, the auxiliary storage device 114 may store two or more operating systems. In addition, the auxiliary storage device 114 stores, for example, data used for the processor 111 to execute various processes, data generated during a process of the processor 111, or various set values.

The auxiliary storage device 114 includes, for example, four partitions. In order to distinguish the four partitions, the four partitions will be referred to as a first partition to a fourth partition. However, the number of partitions included in the auxiliary storage device 114 is not limited thereto.

The first partition stores, for example, a first hibernation image. The first hibernation image is a hibernation image indicating the stored content of the RAM 113 before the connection state of a device connected to the image forming apparatus 10 is checked by the OS. Preferably, the first hibernation image is a hibernation image indicating the stored content of the RAM 113 immediately before the connection state of the device connected to the image forming apparatus 10 is checked by the OS. Accordingly, the first hibernation image does not include connection information indicating the device connection state. The first hibernation image is created by, for example, the image forming apparatus 10. However, the first hibernation image may be created another apparatus such as another image forming apparatus 10.

The second partition stores, for example, a second hibernation image. The second hibernation image is a hibernation image indicating the stored content of the RAM 113, for example, at the time when or after the OS start-up is completed. Accordingly, the second hibernation image includes the connection information indicating the connection state of the device connected to the image forming apparatus 10. The connection information is created by, for example, the OS. In addition, the second hibernation image may include the contents stored in the RAM 113 by the application software. The second hibernation image is created by, for example, the image forming apparatus 10. The second hibernation image may be created by another image forming apparatus 10 having the same configuration as the image forming apparatus 10.

A hibernation image created by the other apparatus is downloaded to the image forming apparatus 10 through, for example, a network and is stored in the auxiliary storage device 114. Alternatively, the hibernation image created by the other apparatus is stored in the auxiliary storage device 114 through a removable storage medium such as a magnetic disk, a magneto-optical disk, an optical disk, or a semiconductor memory. The image forming apparatus 10 can execute the start-up using hibernation without creating a hibernation image by storing a hibernation image created by another apparatus in advance and executing start-up using the hibernation image.

The third partition stores, for example, the system software such as the OS.

The fourth partition stores, for example, the application software.

The programs stored in the ROM 112 or the auxiliary storage device 114 includes programs for executing processes described below. For example, the image forming apparatus 10 is delivered to an administrator or the like of the image forming apparatus 10 in a state where some or all of the programs are stored in the ROM 112 or the auxiliary storage device 114. However, the image forming apparatus 10 may be delivered to the administrator or the like in a state where some or all of the programs are not stored in the ROM 112 or the auxiliary storage device 114. In addition, the image forming apparatus 10 may be delivered to the administrator or the like in a state where separate programs other than the programs are stored in the ROM 112 or the auxiliary storage device 114. Then, the programs for executing the processes described below may be separately delivered to the administrator or the like and written to the ROM 112 or the auxiliary storage device 114 by the operation of the administrator or a service person. At this time, the delivery of the programs can be implemented, for example, by being recorded in a removable storage medium or being downloaded through a network or the like.

The connection interface 12 is an interface for connecting various devices to the image forming apparatus 10. The connection interface 12 relays, for example, communication between the various devices and the image forming apparatus 10. The connection by the connection interface 12 may be wired connection or wireless connection. The various devices may include, for example, a finisher, an ADF (auto document feeder), a card reader, or a paper feed tray. The devices connected to the image forming apparatus 10 are not limited to devices connected through the connection interface and also include devices connected through another interface.

The communication interface 13 is an interface used for the image forming apparatus 10 to communicate with the devices through a network or the like.

The operation panel 14 is a device including a man-machine interface or the like through which data is input and output between the image forming apparatus 10 and an operator of the image forming apparatus 10. The operation panel 14 includes, for example, a button and a touch panel for the operator to operate. In the touch panel, for example, a display such as a liquid crystal display or an organic EL display, and a pointing device using a touch input are laminated. Accordingly, the button and the touch panel function as an input device that receives the operation of the operator. In addition, the display included in the touch panel functions as a display device that notifies various pieces of information to the operator.

The image forming unit 15 prints an image on the image forming medium P by forming the image using toner, ink, or the like. The image forming unit 15 includes, for example, a printer of an electrophotographic method (laser), an ink-jet method, or other methods and executes printing using the printer.

The image reading unit 16 reads an image from an original document. The image reading unit 16 includes a scanner that reads an image from an original document.

The scanner is an optical reduction type including an imaging element such as a CCD (charge-coupled device) image sensor. Alternatively, the scanner may be a contact image sensor (CIS) type including an imaging element such as CMOS (complementary metal-oxide-semiconductor) image sensor. Alternatively, the scanner may be another well-known type.

The bus 17 includes a control bus, an address bus, and a data bus and transfers a signal that is transmitted and received between the respective units of the image forming apparatus 10.

Figure 2:
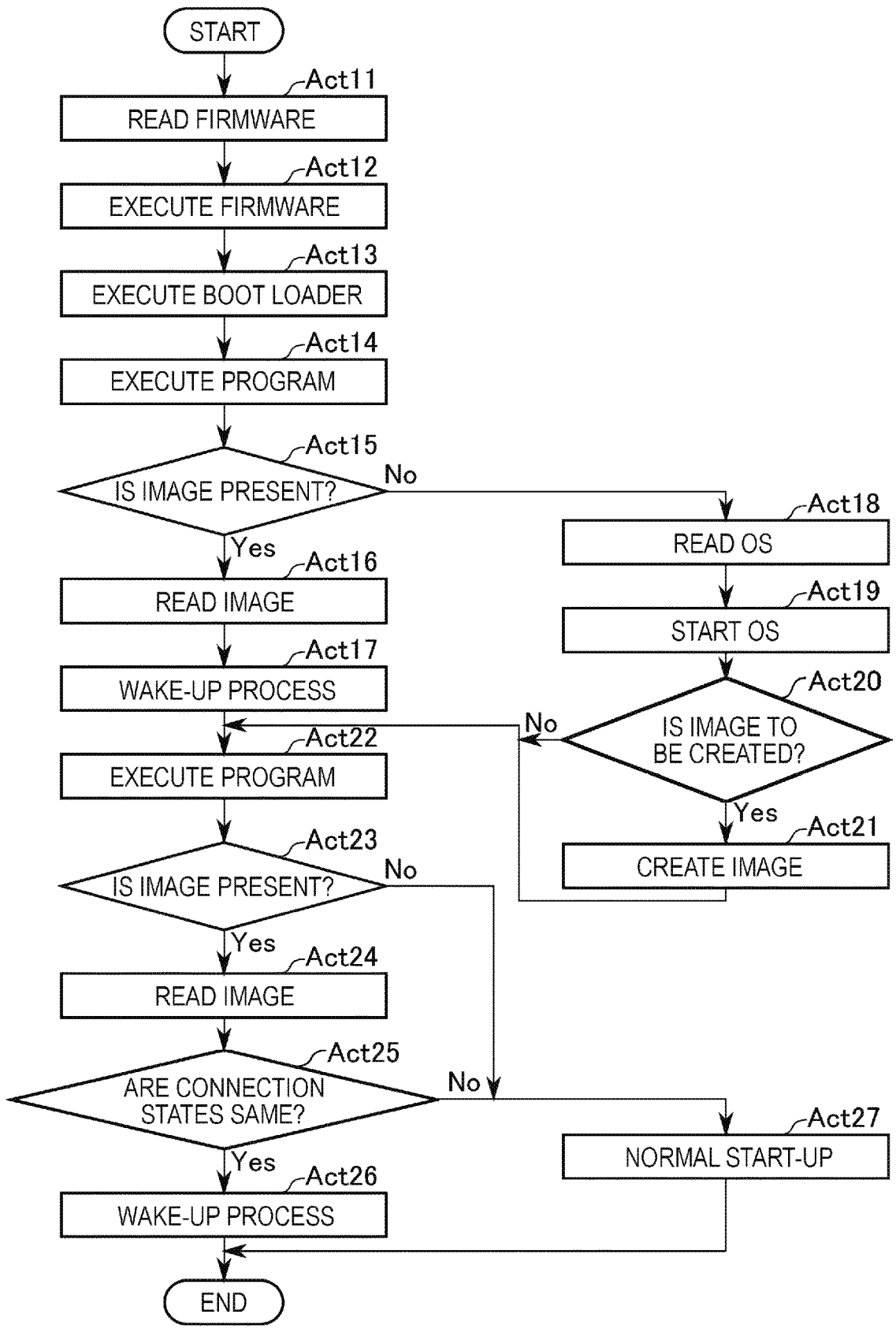
FIG. 2 is a flowchart illustrating an example of processes of a processor in FIG. 1.
Figure 3:
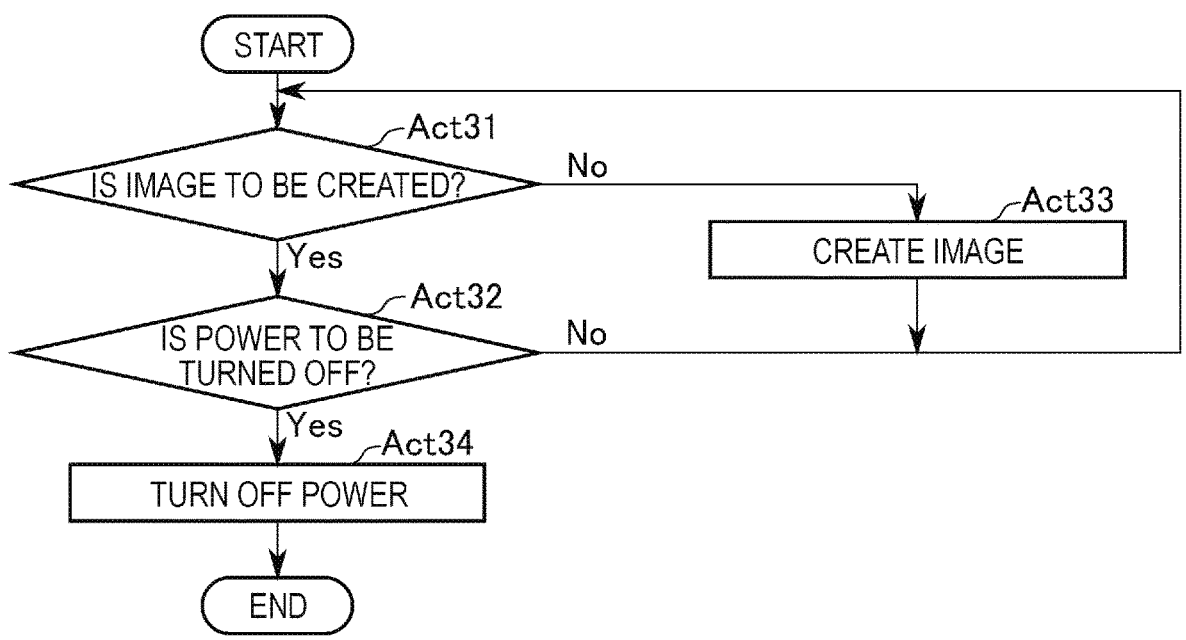
FIG. 3 is a flowchart illustrating an example of processes of the processor in FIG. 1.

Hereinafter, the operation of the image forming apparatus 10 according to the embodiment will be described based on FIGS. 2 and 3. In the following description of the operation, the details of processes are merely exemplary, and various processes capable of obtaining the same effects can be appropriately used. FIGS. 2 and 3 are flowcharts illustrating an example of processes of the processor 111 of the image forming apparatus 10. The processor 111 executes the processes in accordance with, for example, the programs stored in the ROM 112, the auxiliary storage device 114, and the like. FIG. 2 is a flowchart illustrating an example of processes until the start-up is completed after the image forming apparatus 10 is turned on. In addition, FIG. 3 is a flowchart illustrating an example of processes after the start-up of the image forming apparatus 10 is completed. When the processor 111 proceeds from Act N (N represents a natural number) to Act (N+1), the description thereof will not be made in some cases.

The processor 111 starts the operation, for example, when the image forming apparatus 10 is turned on. Turning on the image forming apparatus 10 also includes restart-up of the image forming apparatus 10. The processor 111 starts the processes illustrated in FIG. 2 along with the start of the operation.

In Act 11, the processor 111 reads a program from a predetermined address (hereinafter referred to as "reset vector") to the RAM 113. Alternatively, in Act 11, the processor 111 reads a program from an address recorded in the reset vector into the RAM 113. The reset vector is, for example, an address on the ROM 112 such as a starting address of the ROM 112. In addition, the program to be read herein is, for example, the firmware stored in the ROM 112.

In Act 12, the processor 111 executes the firmware read in Act 11.

In Act 13, the processor 111 executes a primary boot loader included in the firmware. The primary boot loader that is executed by the processor 111 reads a first reading program. The first reading program is included in, for example, the OS.

In Act 14, the processor 111 executes the first reading program read in Act 13. The processes of the subsequent Act 15 and Act 16 are executed by the first reading program.

In Act 15, the processor 111 determines whether or not the first hibernation image is present. That is, the processor 111 determines, for example, whether or not the image forming apparatus 10 stores the first hibernation image. The first hibernation image is stored in a predetermined address of a predetermined partition of the auxiliary storage device 114. Accordingly, when the first hibernation image is stored in the address, the processor 111 determines that the first hibernation image is present. The address is, for example, a starting address of the first partition. When the first hibernation image is present, the processor 111 determines Yes in Act 15 and proceeds to Act 16.

In Act 16, the processor 111 reads the first hibernation image.

In Act 17, the processor 111 loads the stored content indicated by the first hibernation image read in Act 16 to the RAM 113. The processor 111 starts a process based on the stored content loaded to the RAM 113. As a result, the image forming apparatus 10 enters into a state where the OS is starting. At this time, the state of the OS is a state before the OS acquires the device connection state.

On the other hand, when the first hibernation image is not present, the processor 111 determines No in Act 15 and proceeds to Act 18.

In Act 18, the processor 111 calls the OS. That is, the primary boot loader that is executed by the processor 111 reads a secondary boot loader from, for example, an MBR (master boot record) or a GPT (GUID (globally unique identifier) Partition Table) of the auxiliary storage device 114. The processor 111 executes the secondary boot loader. The secondary boot loader that is executed by the processor 111 reads a program for starting the OS (hereinafter, referred to as "start-up program") stored in the auxiliary storage device 114 to the RAM 113.

In Act 19, the processor 111 starts the OS. That is, for example, the processor 111 starts the OS by executing the start-up program read in Act 18. After starting the OS, the image forming apparatus 10 enters into the state before the OS acquires the device connection state as in the state after the process of Act 17.

In Act 20, the processor 111 determines whether or not to create the first hibernation image. For example, when the setting or the like of the firmware or the OS instructs to create the first hibernation image, the processor 111 creates the first hibernation image. When the processor 111 creates the first hibernation image, the processor 111 determines Yes in Act 20 and proceeds to Act 21.

In Act 21, the processor 111 creates the first hibernation image. The first hibernation image created herein includes the stored content of the current RAM 113 at the time of the execution of the process of Act 21. The stored content of the current RAM 113 is the stored content of the RAM 113 in the state before the OS acquires the device connection state. The processor 111 stores the created first hibernation image, for example, in a predetermined address of the first partition of the auxiliary storage device 114.

The processor 111 proceeds to Act 22 after the process of Act 17 or Act 21. In addition, when the processor 111 does not create the first hibernation image, the processor 111 determines No in Act 20 and proceeds to Act 22. The processor 111 continues the start-up by proceeding to Act 22 after creating the first hibernation image. However, the processor 111 may restart the image forming apparatus 10 depending on the situation after the process of Act 22.

In Act 22, the processor 111 executes a second reading program. The second reading program is a program included in, for example, the OS. The OS enters into a state where the second reading program is executable through the process of Act 17 or Act 19.

In addition, the processes of the following Act 22 and Act 23 are executed by the second reading program.

In Act 23, the processor 111 determines whether or not the second hibernation image is present. That is, the processor 111 determines, for example, whether or not the image forming apparatus 10 stores the second hibernation image. The second hibernation image is stored in a predetermined address of a predetermined partition of the auxiliary storage device 114. Accordingly, when the second hibernation image is stored in the address, the processor 111 determines that the second hibernation image is present. The address is, for example, a starting address of the second partition. When the second hibernation image is present, the processor 111 determines Yes in Act 23 and proceeds to Act 24.

In Act 24, the processor 111 reads the second hibernation image.

In Act 25, the processor 111 determines whether or not the connection state of the device connected to the image forming apparatus 10 is the same as the connection state indicated by the connection information of the second hibernation image read in Act 24. When the connection states are the same, the processor 111 determines Yes in Act 25 and proceeds to Act 26.

In Act 26, the processor 111 loads the stored content indicated by the second hibernation image read in Act 24 to the RAM 113. The processor 111 starts a process based on the stored content loaded to the RAM 113. As a result, the start-up of the image forming apparatus is completed. The processor 111 ends the processes illustrated in FIG. 2 after the process of Act 26.

When the second hibernation image is not present, the processor 111 determines No in Act 23 and proceeds to Act 27. In addition, when the connection state of the device connected to the image forming apparatus 10 is different from the connection state indicated by the connection information of the second hibernation image, the processor 111 determines No in Act 25 and proceeds to Act 27.

In Act 27, the processor 111 normally starts the image forming apparatus 10 without using the second hibernation image. In the normal start-up, the processor 111 acquires the connection state of the device connected to the image forming apparatus 10 and executes the start-up based on the connection state. As a result, the connection state is stored in the RAM 113. The processor 111 ends the processes illustrated in FIG. 2 after the process of Act 27.

The processor 111 starts the processes illustrated in FIG. 3, for example, when the start-up of the image forming apparatus 10 is completed.

In Act 31, the processor 111 determines whether or not to create the second hibernation image. For example, when an operation is executed to instruct to create the second hibernation image, the processor 111 determines to create the second hibernation image. When the processor 111 determines not to create the second hibernation image, the processor 111 determines No in Act 31 and proceeds to Act 32.

In Act 32, the processor 111 determines whether or not to turn off the power. For example, when an operation is executed to instruct to turn off the power, the processor 111 determines to turn off the power. Alternatively, for example, when a condition that the non-operation time exceeds a certain period of time is satisfied, the processor 111 determines to turn off the power. When the processor 111 determines not to turn off the power, the processor 111 determines No in Act 32 and returns to Act 31. Thus, the processor 111 creates the second hibernation image or repeats Act 31 and Act 32 until turning off the power.

When the processor 111 determines to create the second hibernation image in a standby mode of Act 31 and Act 32, the processor 111 determines Yes in Act 31 and proceeds to Act 33.

In Act 33, the processor 111 creates the second hibernation image. The second hibernation image created herein includes the stored content of the current RAM 113 at the time of the execution of the process of Act 33. The processor 111 stores the created second hibernation image, for example, in a predetermined address of the second partition of the auxiliary storage device 114. The processor 111 returns to Act 31 after the process of Act 33.

When the processor 111 determines to turn off the power in the standby mode of Act 31 and Act 32, the processor 111 determines Yes in Act 32 and proceeds to Act 34.

In Act 34, the processor 111 executes a process for turning off the power of the image forming apparatus 10.

The image forming apparatus 10 according to the embodiment executes the start-up halfway using the first hibernation image indicating the stored content of the RAM 113 in the state before the device connection state is stored. Next, the image forming apparatus 10 according to the embodiment executes the start-up using the second hibernation image indicating the stored content of the RAM 113 in the state after the device connection state is stored. As a result, the image forming apparatus 10 can reduce the time required to start the reading of the second hibernation image. When the connection state of the device connected to the image forming apparatus 10 is different from the connection state included in the second hibernation image, the image forming apparatus 10 does not execute the start-up using the second hibernation image. However, even in this case, since the image forming apparatus 10 can execute the start-up halfway using the first hibernation image, the start-up speed can be increased.

In addition, the image forming apparatus 10 according to the embodiment executes the start-up using the second hibernation image. Accordingly, the image forming apparatus 10 can rapidly execute the start-up of the OS and the application software or the like.

The image forming apparatus 10 according to the embodiment creates the first hibernation image. As a result, even when the configuration of the image forming apparatus 10 is changed, hibernation can be executed.

The image forming apparatus 10 according to the embodiment creates the second hibernation image. As a result, even when the device connection state is changed, hibernation can be executed.

The image forming apparatus 10 according to the embodiment stores the hibernation image in a predetermined partition. Accordingly, in the image forming apparatus 10 according to the embodiment, the time required to search for the hibernation image is shorter as compared to a case where the partition in which the hibernation image is stored is not predetermined.

The image forming apparatus 10 according to the embodiment stores the hibernation image in a predetermined address. Accordingly, in the image forming apparatus 10 according to the embodiment, the time required to search for the hibernation image is shorter as compared to a case where the address in which the hibernation image is stored is not predetermined.

The above embodiment can also be modified as follows.

In the above embodiment, the hibernation image is stored in a predetermined address of a predetermined partition. However, the location where the hibernation image is stored may not be predetermined.

In addition, the auxiliary storage device 114 may not be partitioned.

The first reading program may be included in the firmware.

When the first hibernation image is not present, the image forming apparatus 10 may execute the start-up without using the second hibernation image.

The system software may be stored in the ROM 112.

The processor 111 may implement some or all of the processes that are implemented in accordance with the programs in the above embodiment by a hardware configuration of a circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device configured to control a computational system, the control device comprising:
   a main storage device configured to store a stored content associated with an operation of the computational system;
   an auxiliary storage device configured to store an operating system, a first hibernation image, and a second hibernation image, the first hibernation image indicates the stored content of the main storage device at a time before the operating system confirms a connection status of a connected device, the second hibernation image indicates the stored content of the main storage after the operating system has completed booting following start-up; and
   a processor configured to start a computer by loading the first hibernation image to the main storage device while the operating system is in the process of booting and subsequently loading the second hibernation image to the main storage device when the computer is turned on, wherein:
   the first hibernation image does not include connection information indicating a device connection state, and
   the second hibernation image includes connection information indicating a device connection state.

2. The control device according to claim 1, wherein, when the device connection state indicated by the connection information is different from a current device connection state, the processor starts the computer without using the second hibernation image.

3. The control device according to claim 1, wherein the processor creates the second hibernation image based on the stored content of the main storage device including the connection information and stores the created second hibernation image in the auxiliary storage device.

4. An image forming apparatus comprising:
   a main storage device;
   an auxiliary storage device configured to store an operating system, a first hibernation image, and a second hibernation image, the first hibernation image indicates the stored content of the main storage device at a time before the operating system confirms a connection status of a connected device, the second hibernation image indicates the stored content of the main storage after the operating system has completed booting following start-up;
   a processor configured to start a computer by loading the first hibernation image to the main storage device while the operating system is in the process of booting and subsequently loading the second hibernation image to the main storage device when the computer is turned on; and
   an image forming unit configured to execute printing based on the control by the processor, wherein
   the first hibernation image does not include connection information indicating a device connection state, and
   the second hibernation image includes connection information indicating a device connection state.

5. The image forming apparatus of claim 4, wherein the image forming unit is operational based on the loaded first hibernation image.

6. The image forming apparatus of claim 4, further comprising a connection interface communicatively connected with the main storage device.

7. The image forming apparatus of claim 6, further comprising a communication interface communicatively connected with the main storage device.

8. The image forming apparatus of claim 7, further comprising an image reading unit connected to and controlled by the processor wherein the image reading unit is configured to acquiring images based on the control by the processor based on the first hibernation image.

9. A method for starting up a device, the method comprising:
   storing, in a main storage device of the device, a state of the device and connection information of the device;
   storing, in an auxiliary storage device of the device, an operating system, a first hibernation image of the state of the device without the connection information, and a second hibernation image of the state of the device including the connection information, the first hibernation image indicates stored content of the main storage device at a time before the operating system confirms a connection status of a connected device, the second hibernation image indicates the stored content of the main storage after the operating system has completed booting following start-up;
   turning on the device;
   loading, from the auxiliary storage device to the main storage device, the first hibernation image while the operating system is in the process of booting; and
   loading, from the auxiliary storage device to the main storage device, the second hibernation image.

10. The method of claim 9, wherein the state of the device includes stored content in the main storage device.

11. The method of claim 9, further comprising determining whether the auxiliary storage device includes the first hibernation image or the second hibernation image.

12. The method of claim 11, further comprising, in response to a determination that the auxiliary storage device does not include the first hibernation image or the second hibernation image, calling a boot loader to turn on the device without the first hibernation image or the second hibernation image.

13. The method of claim 12, further comprising creating a hibernation image based on contents in the main storage device after the device is turned on and operational.

14. The method of claim 13, wherein the main storage device is a random access memory and the created hibernation image excludes connection information of the device.

15. The method of claim 9, further comprising determining whether the connection information stored in the second hibernation image matches a current connection state of the device.

16. The method of claim 15, further comprising:
   in response to a determination that the current connection state of the device does not match the connection information of the second hibernation image, turning on the device as a normal start-up; and
   in response to a determination that the current connection state of the device matches the connection information of the second hibernation image, turning on the device in a wake-up process.

17. The method of claim 16, wherein turning on the device as a normal start-up includes loading the first hibernation image.

18. The method of claim 17, wherein turning on the device in the wake-up process is faster than turning on the device as a normal start-up.

19. The method of claim 18, wherein turning on the device as a normal start-up is faster than turning on the device without loading the first hibernation image.

20. The method of claim 9, further comprising reading and executing firmware before loading the first hibernation image.

* * * * *